United States Patent [19]

Parrish et al.

[11] Patent Number: 4,794,822

[45] Date of Patent: Jan. 3, 1989

[54] ROCK BIT MANUFACTURING METHOD

[75] Inventors: John D. Parrish, Houston; Rodney A. Bellamy, Fort Worth, both of Tex.

[73] Assignee: Baker Hughes Incorporated, Houston, Tex.

[21] Appl. No.: 133,101

[22] Filed: Dec. 14, 1987

[51] Int. Cl.⁴ ............................................. B21K 5/02
[52] U.S. Cl. ................................. 76/108 A; 409/132; 51/281 P
[58] Field of Search ............ 76/101 R, 101 E, 108 R, 76/108 A; 51/281 R, 217 R; 409/131, 132, 219, 225

[56] References Cited

U.S. PATENT DOCUMENTS

| 4,136,586 | 1/1979 | Neilson et al. | 76/108 A |
| 4,209,124 | 6/1980 | Baur et al. | |
| 4,414,734 | 11/1983 | Atkinson. | |
| 4,507,843 | 4/1985 | Atkinson. | |
| 4,559,852 | 12/1985 | Atkinson. | |

Primary Examiner—Roscoe V. Parker
Attorney, Agent, or Firm—Robert A. Felsman

[57] ABSTRACT

A method of manufacturing a rock bit of previously formed lugs which will be welded to form a body. Initially, a shank end positioner means such as drilled holes are formed on the lug, which are then positioned on a mating receiver such as dowels in a fixture. The bearing end of the lug is clamped against a locator block to establish a predetermined relationship between the shank end and the bearing end of the lug. This relationship determines both the radial, axial and angular positions of the bearing and shank ends of the lug. Then, the faces of the lug are machined while held in this accurate alignment. When assembled and welded with similarly manufactured lugs, a bit of exceptional accuracy is produced in a cost effective manner. A slightly different position of the locator block permits the use of lugs of normal forging tolerances to be positioned to provide another location of the faces and bits of different sizes.

6 Claims, 2 Drawing Sheets

ROCK BIT MANUFACTURING METHOD

BACKGROUND OF THE INVENTION

1. Field of the Invention:

This invention relates to earth boring bits—especially to methods of improved manufacture.

2. Description of the Prior Art:

The typical earth boring (rock) bit used in the drilling of oil, gas or other mineral wells employs a body composed of several—usually three—lugs. A cantilevered bearing shaft depends from each lug to support a rotatable cutter with earth disintegrating teeth. Each lug has machined faces that mate with similar, opposed faces on the adjacent lugs and, when welded, a fluid tight body results.

The lugs of a rock bit must be manufactured and welded accurately to achieve a geometry that conforms with design criteria. It has been especially difficult to establish the requisite accuracy in the machining of the opposed faces of the lugs. These faces, called 120 degree faces on a three cone bit, must be accurate if the bit which results is to achieve an economical use in the harsh environment encountered during drilling.

SUMMARY OF THE INVENTION

The principal object of the invention is the provision of an improved rock bit manufacturing method that economically achieves accuracy in the alignment and connection of the lugs used to form the body of the bit. In this method each lug is generally formed by a forging process, after which a transverse flat is machined on the shank and (i.e., end of lug to be threaded). Then, at least one locator holes is drilled generally perpendicularly into the flat for positioning on a mating dowel in a fixture. The lug is then clamped in the fixture with the exterior of its bearing end held firmly against a locator block a predetermined radial and axial distance from the dowel. While clamped in this position, the mating (usually 120 degree) faces are machined. This results in faces that are accurately aligned when joined with other, similar faces, and the manufacture of a bit body with essentially identical and accurately formed lugs. It also permits the manufacture of bits of differing diameters from the same forging by varying the radial distance of a positioner block from the dowel.

The above, as well as additional objects, features and advantages of the invention will become apparent in the following description.

DESCRIPTION OF THE PREFERRED EMBODIMENT

Figure 1:
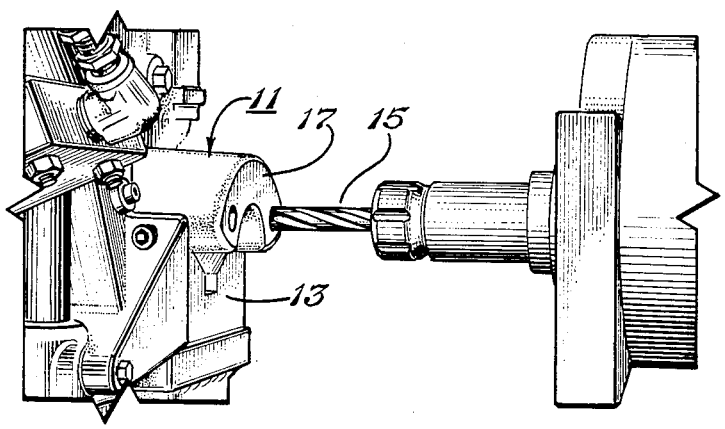
FIG. 1 is perspective view showing the shank end of a lug of a rock bit while a locator hole is being drilled in a previously milled flat.
Figure 2:
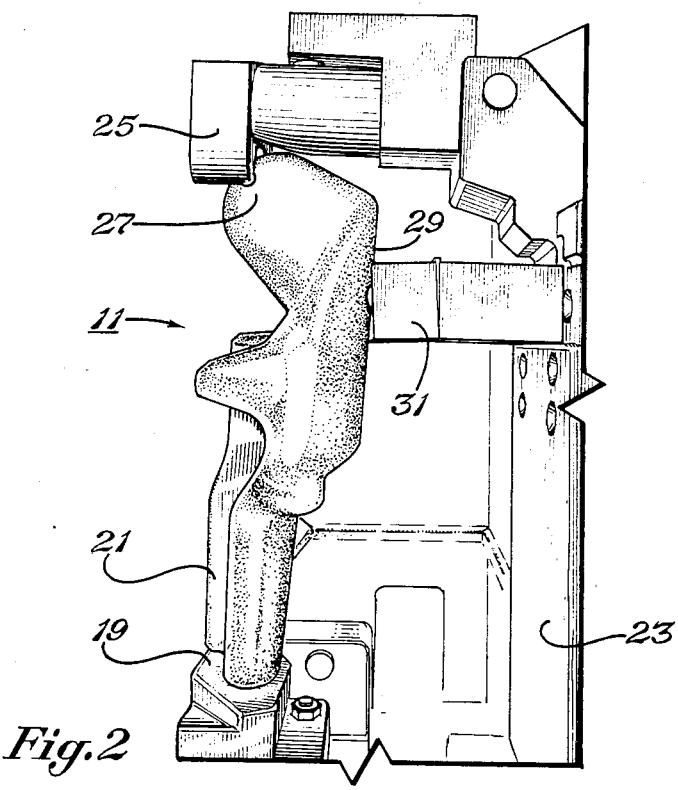
FIG. 2 is a side elevational view of the lug of FIG. 1 with its shank end held by positioner dowels registering with the drilled holes. The exterior of the bearing end of the lug is clamped against a locator block.

The numeral 11 in the drawings designates a lug which is used with similar lugs (usually three) in the manufacture of an earth boring rock bit used in the drilling of wells in the earth for the production of water, oil, gas and minerals. Such lugs are constructed from a class of methods consisting of casting and forging, the larger usually being cast and the smaller forged.

In FIG. 1 only one end called the "shank end" of the lug 11 is visible, the remainder being held in a fixture 13 during the method step of drilling with a drill 15 a generally perpendicular hole in a flat 17 that was previously milled on the shank end of the lug 11. The flat 17 is milled to be perpendicular to an imaginary center line (not shown) of a completed rock bit. Such center lines are usually shown in the drawings used in the manufacture of the typical rock bit.

Generally, two holes are drilled into the flat 17 a selected distance apart for positioning on mating dowels 18,20 (see FIG. 3) that protrude upwardly from positioner means or receiver 19. The drilled holes and dowels are dimensioned to cause a rigid positioning of the shank end 21 of the lug 11, both vertically and radially, with respect to another fixture 23 upon which the positioner means 19 is located and upon which the lug is positioned after removal from the fixture 13.

In fixture 23 a clamp 25 grips the bearing envelope 27 that extends inwardly from an exterior surface 29 on the bearing end of the lug 11. This forces the exterior surface 29 of the lug firmly against a locator block 31 extending from the fixture 23. The clamp and locator block are configured to place and hold the bearing envelope, shank end of the lug and exterior surface 29 in a rigid, fixed and predetermined position relative to the shank end 21 of the lug 11, its flat 17 and associated drilled holes.

Figure 3:
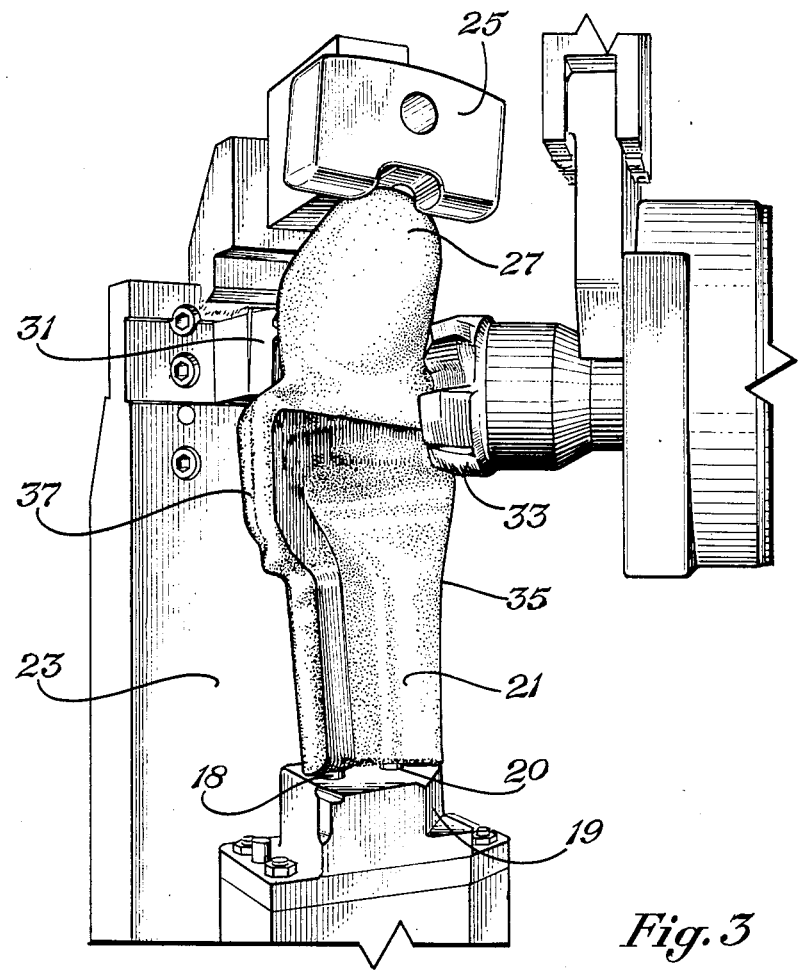
FIG. 3 is a perspective view of the lug of FIGS. 1 and 2 and a milling tool being used to machine the 120 degree faces.

While clamped in the above described position, a milling tool 33 of the type shown in FIG. 3 machines first one and then the other of the 120 degree faces 35,37 on the lug. The typical three cone rock bit has tree lugs which are joined along faces that align, when seen from above, with an angle of 120 degrees from the above mentioned imaginary center line of the completed rock bit.

The typical lug forging or casting has a tolerance to permit shrinkage and distortion when cooling after the forging or casting operation. The tolerances of forgings and castings is large enough to permit machining of bearing surfaces on the bearing end of the lug of more than one size. The tolerances led to excess metal sufficient to permit use of the above method to form bits or more than one size with lugs of the same dimensions. To do so the locator block 31 is repositioned radially such that the radial location of the outer surface 29 of the bearing end of the lug is altered a selected amount either inwardly or outwardly. When milled in this altered position, the angular definition of the 120 degree faces is altered and, when joined with similarly formed lugs, creates a bit of selected different size.

Expressed in method terminology, the invention may be described as: (1) forming a lug 11; (2) milling a flat 17 on its shank end; (3) drilling at least one but preferably two holes generally perpendicularly in the flat 17; (4) clamping the lug 11 with its exterior surface 29 of the bearing end against a locator means 31 a predetermined radial and axial distance from the holes in the flat 17; (5) milling flat surfaces 35,37 on the lug. Eventually, similar lugs are joined along the surfaces 35,37 and welded to form the body of a rock bit of exceptional accuracy.

It should be apparent from the above description that an invention having significant advantages has been provided. This method of manufacture produces essentially identical lugs that have shank ends and bearing ends aligned accurately with respect to each other and the 120 faces. Thus, the elevational, radial and angular alignment of the lugs when assembled and welded achieves a high degree of precision in a cost effective and efficient manner. Also, by repositioning the locator means 31 the position of a lug is changed on fixture 23 to enable the manufacture of bits with a variety of diameters.

While the invention has been described in only one of its forms, it should be apparent to those skilled in the art that it is not thus limited, but is susceptible to various changes and modifications without departing from the spirit thereof.

We claim:

1. The method of manufacturing an earth boring bit having a body of welded lugs, each with a shank end and an opposite bearing end to support a rotatable cutter on a cantilevered bearing shaft, the method comprising the steps of:

forming a lug;

forming a shank end positioner means on the lug;

positioning the lug by means of the positioner means on a mating receiver in a fixture;

clamping the lug with the exterior of its bearing end against a locator;

milling at least one flat surface along the lug from the shank end toward the bearing end while clamped on the receiver and against the locator;

whereby each lug may be assembled with at least one similarly formed lug to have accurate vertical alignment and a precise outer diameter.

2. The invention defined by claim 1 wherein the lug is sized to permit a differing location of the locator and a different location of the faces to manufacture alternate sizes of bits.

3. The method of manufacturing an earth boring bit having a body of welded lugs, each with a shank end and an opposite bearing end to support a rotatable cutter on a cantilevered bearing shaft, the method comprising the steps of:

forming a lug;

machining a flat on the shank end of he lug;

drilling at least one locator hole into the milled flat;

positioning the lug by means of the locator hole on a mating dowel in a fixture;

clamping the lug with the exterior of its bearing end against a locating block on the fixture a predetermined radial distance from the dowel;

milling at least one flat surface along the lug from the shank end toward the bearing end while clamped on the dowel and against the locating block;

whereby each lug may be assembled with at least one similarly formed lug to have accurate vertical alignment and a precise outer diameter.

4. The invention defined by claim 3 wherein the lug is sized to permit a differing location of the locator block and a different location of the faces to manufacture alternate sizes of bits.

5. The method of manufacturing an earth boring bit having a body of welded lugs, each with a shank end and an opposite bearing end to support a rotatable cutter on a cantilevered bearing shaft, the method comprising the steps of:

forming a lug by a process selected from the class consisting of forging and casting;

milling a flat on the shank end of the lug;

drilling a pair of spaced locator holes into the milled flat;

positioning the lug by means of the locator holes on a pair of mating dowels in a fixture;

clamping the lug with the exterior of its bearing end against a locating block on the fixture a predetermined radial distance from the dowels;

milling at least one surface along the lug from the shank end toward the bearing end while clamped on the dowels and against the locating block;

whereby each lug may be assembled with at least one similarly formed lug to have accurate vertical alignment and a precise outer diameter.

6. The invention defined by claim 5 wherein the lug is sized to permit a differing location of the locator block and a different location of the faces to manufacture alternate sizes of bits.

* * * * *